United States Patent Office 2,778,845
Patented Jan. 22, 1957

2,778,845

SYNTHESIS OF ORGANIC COMPOUNDS AND CATALYST THEREFOR

Henry G. McGrath, Union, and Louis C. Rubin, West Caldwell, N. J., assignors to The M. W. Kellogg Company, Jersey City, N. J., a corporation of Delaware No Drawing. Application September 24, 1953,
Serial No. 382,218

4 Claims. (Cl. 260—449.6)

This invention relates to the synthesis of organic compounds. In one aspect this invention relates to the hydrogenation of a carbon oxide with an iron type catalyst to produce organic compounds. In another aspect this invention relates to a new catalyst composition and method for manufacturing same, which new catalyst is useful in the production of organic compounds including hydrocarbons from carbon monoxide and hydrogen. Carbon oxides include carbon monoxide, carbon dioxide and organic compounds containing a carbonyl group, such as ketones, aldehydes, etc.

This application is a continuation-in-part of my application Serial No. 72,758, filed April 14, 1952, now Patent No. 2,683,726 which is a division of application Serial No. 735,536, filed March 18, 1947, and now Patent No. 2,543,327.

It has been known for some time that hydrogen and carbon monoxide may be made to react exothermically in the presence of catalysts under specific reaction conditions to form hydrocarbons and oxygenated compounds. In general, the synthesis of these organic compounds by the hydrogenation of carbon monoxide is accomplished in the presence of a metal or an oxide of a metal chosen from group VIII of the periodic table as a catalyst at pressures below about 500 pounds per square inch gage and at temperatures below about 750° F.

The synthesis feed gas or reaction mixture comprises a mixture of about two mols of hydrogen per mol of carbon monoxide and may be prepared by the catalytic conversion of natural gas, steam, and carbon dioxide, or the partial oxidation of natural gas with oxygen, or the gasification of coal.

Various techniques have been practiced to effect the reaction of hydrogen and carbon monoxide to produce organic compounds. Among these techniques are those known as fixed-bed catalyst operations and fluidized catalyst operations. The fixed-bed operation comprises passing a reaction mixture of hydrogen and carbon monoxide through a stationary bed of catalyst in a reaction zone, and the fluidized operation comprises passing a reaction mixture through a finely-divided catalyst mass suspended in the reaction mixture and gaseous products in the reaction zone.

It is an object of this invention to provide a process for the synthesis of organic compounds.

Another object of this invention is to hydrogenate carbon monoxide in the presence of an iron type catalyst to produce organic compounds having more than one carbon atom per molecule.

A further object is to provide a catalyst which is more selective and results in increased yields of saturated normally liquid hydrocarbons having more than one carbon atom per molecule and of intermediate boiling range.

It is another object of this invention to provide a method for manufacturing a hydrogenation catalyst.

It is still a further object of this invention to provide a novel catalyst for the hydrogenation of a carbon oxide.

It is another object of this invention to provide an improved hydrogenation catalyst characterized by a lower carbon deposition during synthesis.

Further objects and advantages of this invention will become apparent to those skilled in the art from the accompanying description and disclosure.

According to this invention, a highly satisfactory and improved catalyst for the hydrogenation of a carbon oxide to produce organic compounds comprising iron as the essential catalytically active component promoted with a minor amount of an oxide of manganese. According to an embodiment of this invention, naturally occurring magnetite containing added manganese in suitable chemical form is fused under conditions such that a molten mass is formed and thereafter the molten mass is cooled sufficiently to solidify the same. The solidified fused mass is reduced to produce a very active and selective catalyst containing reduced iron as the major component and an oxide of manganese as a minor component.

Generally, the fusion of the naturally occurring magnetite is carried out at a temperature above about 2000° F.; the actual temperature will depend upon the other ingredients accompanying the magnetite, such as alumina, silica, and titanium oxide, which tend to lower the fusion temperature of the magnetite. After fusion and solidification, the fused mass is crushed and ground to a relatively small size, and then reduced with a reducing gas, such as hydrogen, at a temperature of at least 900° F. at atmospheric pressure and as high as 1600° F. The reduction may be carried out at substantially lower temperatures when super-atmospheric pressures are used; such temperatures may be as low as about 600° F. to about 800° F. The reduction process is carried out for a sufficient length of time to reduce about 90 to 95 percent of the magnetite, usually indicated by the cessation of the formation of water.

A conveniently available and relatively cheap naturally occurring magnetite is concentrated Alan Wood ore which contains about 1 to 2 percent alumina, about 1 percent silica, about 0.4 to 1 percent titanium oxide by weight, and the remainder magnetite ($Fe_3O_4$) and is a native ore of New Jersey. Since it is the essence of this invention to have present in the ultimate catalyst a minor amount of an oxide of manganese and if desired other promoting or activating ingredients, it is often necessary when using a naturally occurring magnetite to add these promoters to the catalyst. According to one modification of this invention, such promoters including manganese are incorporated into the catalyst by mixing them with the Alan Wood ore prior to fusion. The promoters are often added in the form of elements, oxides, carbonates, hydroxides, etc. to the Alan Wood ore and thoroughly mixed therewith before fusion. The promoters may be added and mixed dry or they may be added in the form of an aqueous solution and mixed with the Alan Wood ore to form a paste therewith. When the promoters are added as an aqueous solution to form a paste with the Alan Wood ore, the paste is dried, preferably at a temperature between about 200° F. and about 300° F. for several hours, and the resulting hard cake is crushed and then fused.

As used in this specification promoters or activators are used synonomously and include a material containing a metal or silicon incorporated in a minor amount with the iron compound during the catalyst preparation, or which is present as a minor component of the ultimate catalyst, and which has a substantially beneficial effect on the desired reaction. It is believed that, although promoters may be admixed with the magnetite during preparation of the catalyst in forms other than the oxides, the actual promoting materials in the ultimate catalyst usually, although not necessarily, consist of the oxides. Since naturally occurring magnetite often contains small amounts of alumina, silica, and titania, these promoting materials may be present in the final catalyst in small amounts regardless whether they were added or not. Usually alumina, silica, and titania of the original ore are present in reduced magnetite in a total amount less than about 2 weight percent. Promoters or activators including manganese which may be added to the magnetite ore during the catalyst preparation comprise other metals and silicon and their compounds including oxides, nitrates, sulfates, chlorides, carbonates, hydroxides, and organic compounds. For example, the following may be used in combination with the manganese promoter of this invention: Co, Ni, Ti, Si, Al, $TiO_2$, CuO, $Al_2O_3$, $SiO_2$, $K_2O$, CoO, $CeO_2$, MgO, $ThO_2$ $MoO_3$, $K_2CO_3$, $Al(COOH)_3$, $Al(NO)_3$, ZnO, $Ce(OH)_4$, KOH, $Co(NO_3)_2$, $H_2MoO_4$, KCl, $SiCl_4$, $AlCl_3$, $H_2SiO_3$, $Rb_2CO_3$, and $Cs_2CO_3$. When present in the final catalyst preparation, the oxide of manganese, either alone or in combination with the oxides of silicon, aluminum, titanium, molybdenum, cobalt, copper, and thorium preferably constitute in total between about 0.1 and about 10 weight percent of the catalyst. Potassium calculated as the oxide has been found to be a desirable promoter or activator when present in the resulting catalyst between about 0.2 and about 2.5 percent to be added in addition to the oxide of manganese.

The preferred amount of oxide of manganese in the ultimate catalyst is betwen about 0.6 and about 5 weight percent. Best results have been observed with catalysts containing between about 0.8 and about 1.5 weight percent manganese oxide.

When the promoters are added to the Alan Wood ore and fused, it is believed that they often form a solution with the $Fe_3O_4$ in the molten state and, when cooled and solidified, may be present as a solid solution with $Fe_3O_4$. Thus, it is preferred that such promoters be added prior to fusion. During fusion certain additive materials decompose and remain in solid solution, for example, as the oxides. The reduction process reduces $Fe_3O_4$ to metallic iron (Fe) and may in some instances reduce the promoters.

The exact chemical form of the promoters in the resulting catalyst is not certain, but the promoters are considered to be present in minor amount in the ultimate catalyst composition as the oxides unless added in a form that does not change during fusion. Whatever the exact form of the promoters in the reduced catalyst, they are found to have an influence upon the activity and selectivity of the catalyst itself, especially when incorporated in the catalyst according to this invention.

Since iron in the reduced form is somewhat malleable, it is highly desirable to crush and grind the material to the required size for use at catalyst prior to reduction. Where the catalyst is to be used in a fluidized operation in a finely divided form, the fused material is ground to a size less than about 30 mesh, and formed, e. g. by pelletting, briquetting, extrusion, etc., prior to reduction and then reduced in a fixed bed. After reduction the material is broken into its previously finely divided state but with much less effort than would be required had the reduced material not been ground and pulverized prior to reduction. The contact material may also be ground to appropriate size for fluidization and reduced as a fluidized mass.

When it is desired to produce the minimum amount of methane and carbon dioxide in the hydrogenation of carbon monoxide, a minor proportion of a material containing an alkali metal, such as potassium, or an alkaline earth, should be present in the catalyst in addition to the oxide of manganese. The presence of potassium in the ultimate catalyst composition is achieved by incorporating potassium carbonate, potassim hydroxide, or potassium nitrate with the Alan Wood ore prior to fusion or, as is preferable in some instances, with the fused material just prior to reduction. In the latter case the carbonate, hydroxide, or nitrate of potassium is added after the ore has been fused.

Reducing naturally occurring magnetite in the presence of added oxide of manganese without fusion will produce a hydrogenating catalyst. However, to obtain both maximum activity and selectivity it is much preferred to fuse the naturally occurring magnetite prior to reduction since by fusion the promoter is usually brought into solution with the magnetite.

In a modification of this invention, the naturally occurring magnetite is not fused but is only heated to a moderately high temperature, preferably about 1000° F. This moderate temperature treatment is referred to herein as calcination and may be effected in an oxidizing, reducing, or inert atmosphere without departing from the scope of this invention. In most instances the calcination is carried out in a substantially inert or a substantially oxidizing atmosphere. In this moderate temperature heat treatment, a lower temperature is used than in the case of fusion and for this reason replacing fusion by such a calcination treatment results in a much cheaper and more economical process for the manufacture of a synthesis catalyst. The promoting materials may be added either prior or subsequent to the calcination treatment. In case of the alkali metal and alkaline earth metals, such promoters are preferably added subsequent to calcination. Any other promoters are preferably added prior to calcination. After the naturally occurring magnetite, such as Alan Wood ore, has been calcined, the calcined material is ground to the desired size and then reduced. The calcination of the ore may be carried out at a temperature as low as 1000° F. but is usually carried out at a temperature between about 1400° F. and about 1600° F. for a time between about 2 and about 12 hours, which time depends, of course, upon the temperature used. At higher temperatures shorter heating periods are necessary than at lower temperatures. As previously mentioned, it it preferred to add the potassium carbonate or hydroxide after calcination either by mixing dry or by mixing an aqueous solution of the compound with the calcined material. When the promoter is mixed as an aqueous solution with the calcined material to form a paste, the paste is dried, preferably at a temperature between 200° F and 300° F. for at least two hours. After the calcined material has been dried, it is reduced at a temperature preferably between about 1400° F. and about 1500° F., or at lower or higher temperatures as previously discussed.

Coking inhibitors may be added to the fused or calcined contact mass just prior to reduction. Such coking inhibitors include $SnCl_4$, and $Pb(NO_3)_2$.

Calcining the naturally occurring magnetite in the presence of added promoters may have much the same effect as the fusion since it may cause a dispersion of the promoters on the surface of the particles of the naturally occurring magnetite, thus increasing the beneficial effect of the promoting materials.

The manganese promoted iron type catalyst of this invention may be employed either in stationary bed or in fluidized operations with improved results; however, it is much preferred to use the catalyst in the fluidized operation.

A preferred embodiment of this invention involves flowing a gaseous mixture comprising hydrogen and a carbon oxide to be hydrogenated upwardly in a reaction zone in contact with a mass of finely divided metallic iron catalyst promoted with an oxide of manganese prepared in the manner described herein. The hydrogen and carbon oxide reactants are passed as gases through the reaction zone, under conditions effective to react all, or a major proportion, of the carbon oxide reactant. The gaseous mixture is passed upwardly through the mass of catalyst at a velocity sufficient to suspend or entrain the catalyst mass in the gas stream. Preferably, the velocity of the gas stream passing through the reaction zone is sufficiently low to maintain the catalyst mass in a dense, fluidized, pseudo-liquid condition. However, the velocity may be sufficiently high to entrain at least a substantial portion of the finely divided catalyst in the gas stream to form a continuous catalyst phase which circulates with the flowing gas stream, without departing from the scope of this invention. In the former condition the catalyst mass may be said to be suspended in the gas stream, but not entrained therein in the sense that there is movement of the catalyst mass as such in the direction of flow of the gas stream. When operating in the pseudo-liquid condition it is preferred to maintain the upward velocity of the gas stream sufficiently high to maintain the fluidized catalyst mass in a highly turbulent condition in which the catalyst particles circulate at a high rate in the pseudo-liquid mass. In this pseudo-liquid condition of operation a small proportion of catalyst in the fluidized mass may become entrained in the gas stream emerging from the upper surface of the fluidized mass whereby catalyst thus entrained is carried away from the mass.

In the present process it is preferred to employ the hydrogen and carbon oxide in ratios such that there is a substantial excess of hydrogen. Therefore, the charging rate in the present process is defined by reference to the rate at which the carbon oxide is charged, in terms of standard cubic feet, in the gas form, of the carbon oxide per hour per pound of the metal catalyst in the dense pseudo-liquid mass of catalyst in the reaction zone. The fluidized process is preferably operated at a minimum space velocity equivalent to charging rate of about 1.0 standard cubic foot of the carbon oxide reactant, per hour per pound of the metal catalyst in the dense catalyst phase. A standard cubic foot of the carbon oxide is that quantity of a normally gaseous carbon oxide which would occupy one cubic foot at atmospheric pressure and 60° F., or an equivalent quantity of a normally liquid carbon oxide reactant.

The catalyst material employed in the present invention is a finely divided powder comprising metallic iron containing the appropriate amount of promoter or promoters incorporated with the iron in the manner described hereinbefore, or a mixture of such iron catalyst and other catalytic materials or non catalytic materials. While the catalyst powder consists essentially of such catalytic material prepared according to this invention, it may include also ingredients, and supporting materials, such as alumina, silica gel, bentonite type clay, etc. In this specification and claims the catalyst composition is described by reference to its chemical condition prior to contact with the reactants.

For fluidized operations, the powdered catalyst initially contains no more than a minor proportion by weight of material whose particle size is greater than 250 microns. Preferably, also, the greater proportion of the catalyst mass comprises material whose particle size is smaller than 100 microns, including at least 25 weight percent of the material in particle sizes smaller than 40 microns. A highly desirable powdered catalyst comprises at least 75 percent by weight of material smaller than 150 microns in particle size, and at least 25 percent by weight smaller than about 40 microns in particle size.

In the preferred form of the invention with the catalyst present in a pseudo-liquid condition, the powdered catalyst mass of iron is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the concentration of catalyst is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. The latter is the velocity at which the gas stream would flow through the reactor in the absence of catalyst. In the dense phase the concentration of the catalyst in the gas stream varies from a maximum near the gas inlet to a minimum in the upper part of this phase. Likewise the concentration of catalyst in the diffuse phase varies from a maximum near the upper surface of the dense phase to a minimum in the upper part of the reactor. Between the dense phase of high average concentration and the diffuse phase of very much lower average concentration, there is a relatively narrow zone in which the concentration of solids in the gas stream changes in a short space from the high concentration of the dense phase to the low concentration of the diffuse phase. This zone has the appearance of an interface between two visually distinct phases.

This dense phase operation ordinarily involves employment of catalyst powders and gas velocities such that a relatively small portion of the fluidized catalyst is carried away by entrainment, and it is necessary, therefore, to provide means in the reactor for separating such entrained catalyst and returning it to the dense phase, or to provide means externally of the reactor to separate the small amount of entrained catalyst from the gas stream and return it to the reactor, or otherwise to recover catalyst from the product gas stream.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The pseudo-liquid operation in which the finely powdered catalyst is employed in a form consisting of the metallic iron catalyst and containing at most minor proportions of promoting agents provides very high catalyst concentrations in the reaction zone. The employment of the finely powdered metal catalyst in a fluidized bed with efficient cooling means also is a factor in permitting the use of high catalyst concentrations, since it facilitates the removal of heat from the relatively concentrated reaction zone. The pseudo-liquid operation, employing the finely divided metal catalyst, results in initial catalyst concentrations of at least 30 pounds per cubic foot of the fluidized dense catalyst phase, while preferred gas velocities result in intial concentrations of 40 to 120, or more, pounds per cubic foot of dense phase. It will be understood that these figures refer to the initial average concentration in the dense phase. The accumulation of reaction products on the catalyst particles as the operation proceeds reduces the catalyst density and increases the bulk of the dense fluidized mass.

With the improved iron catalyst of this invention temperatures in the range of about 350° F. to about 750° F., preferably 550° F. to 650° F., and pressures between atmospheric pressure and the maximum pressure at which condensation is avoided may be employed. It is desirable, however, to employ pressures of at least 80 p. s. i. gage, and preferably about 150 to about 500 or 600 p. s. i. gage.

In this specification, pressures are expressed as pounds per square inch gage and gas volumes as cubic feet measured at 32° F. and atmospheric pressure.

The linear velocity of the gas stream passing upwardly through the dense phase is conveniently expressed in terms of the superficial velocity, which is the linear velocity the charge gas stream would assume if passed through the reactor in the absence of catalyst, and takes into account the shrinkage in volume caused by the reaction. These superficial velocities preferably are in the range of from 0.1 to 6 feet per second for the dense phase operation. When operating with a continuous catalyst phase in which the catalyst is entrained in the flowing gaseous mixture, velocities as high as 40 feet per second may be employed.

The reactants are passed into and through the reaction zone at a space velocity equivalent to at least 1.0 standard cubic foot of the carbon oxide per hour per pound of metal catalyst in the dense catalyst phase. In the hydrogenation of carbon monoxide with the iron catalyst of this invention, it is preferred to operate at a space velocity equivalent to at least 2.0 standard cubic feet of carbon monoxide per hour per pound of iron catalyst in the dense catalyst phase. The charging rate is defined by reference to the carbon monoxide reactant, since the ratio of the hydrogen reactant to the carbon monoxide reactant in the charge gas may vary within wide limits. This ratio of hydrogen to carbon monoxide is usually in excess of 1:1, and preferably at least 2:1, and may be as high as 10:1. At the 1:1 ratio the preferred charging rate of hydrogen and carbon monoxide would, therefore, be at least 4.0 standard cubic feet per hour per pound of iron catalyst in the dense catalyst phase. At the 2:1 ratio this preferred rate would be 6.0 standard cubic feet of hydrogen and carbon monoxide.

According to a preferred modification of this invention, a fresh feed gas having an $H_2:CO$ ratio higher than the ratio in which these compounds are converted to other compounds is employed and the mol ratio of hydrogen to carbon monoxide in the charge to the reactor is increased to the desired figure by recycling a portion of the unconverted gas, after removal of part or all of the product liquid. Preferably, a gas containing excess hydrogen is processed under conditions effective to react all, or a major proportion, of the carbon monoxide, and a portion of the product mixture, after removal of the greater part of the normally liquid product, is recycled in volumetric ratios to the fresh feed gas of 0.5:1 to 10:1.

Fluid operations are carried out at temperature levels which are relatively high as compared to those which would be permissible in fixed or stationary catalyst bed operations under comparable operating conditions. This results from the excellent heat transfer capacity of the fluidized mass of finely divided iron and the effect of excess hydrogen in minimizing carbon formation.

The following examples are illustrative of the procedure for manufacturing a hydrogenation catalyst according to this invention and show the final catalyst composition and the yield of hydrocarbon oils and oxygenated compounds produced by the hydrogenation of carbon monoxide. Since the examples are illustrative only of the application and composition of the catalyst, they should not be considered to be unnecessarily limiting to the present invention and are offered merely as a better understanding of the process for the manufacture of a novel catalyst and its performance.

The results obtained when using the catalysts prepared according to this invention are presented in conventional tabular form. The contraction, yield of observed oil and water may be taken as indications of catalyst activity. The yield of observed oil represents the product collected in the primary receiver at room temperature and operating pressure and in the secondary receiver at about −80° F. and atmospheric pressure. This yield of oil is not the total yield of organic compounds since it does not include most of the gaseous hydrocarbons made or the organic compounds soluble in the water product. The yield of observed water represents the aqueous layer recovered in the primary and secondary receiver and includes the organic compounds soluble therein.

The inspections on the oil and water were obtained by conventional methods of analysis and these data may be used as a measure of catalyst selectivity. The unsaturate content of the oil is calculated and reported as the "mol per cent monoolefins" although there may be some diolefins present. The "weight percent water-KFR" is obtained by use of the Karl Fischer Reagent (KFR) and the difference between that value and 100 percent is a measure of the organic chemicals (oxychemicals) contained in the observed water product. All of the oxygenated organic compounds (acids, alcohols, aldehydes, ketones, etc.) are not present in the observed water but some are present also in the observed oil product. The yield of acids contained in the water is expressed as the equivalent yield of acetic acid although higher molecular weight acids are also present.

EXAMPLE I

Approximately 1260 grams of manganese nitrate solution (Bakers CP 80% $Mn(NO_3)_2.6H_2O$) was diluted with 250 cc. of water and heated to 194° F. The warm manganese nitrate solution was thoroughly mixed with about 6800 grams of hot powdered Alan Wood magnetite ore, the ore having been heated to a temperature of about 220° F. The resulting paste was dried overnight at a temperature of about 220° F. The dried material was then thoroughly mixed with a warm solution of potassium carbonate which was prepared by dissolving 44.3 grams of potassium carbonate in 500 cc. of water and warming to about 194° F. It was necessary to add an additional 300 cc. of water in order to obtain a thorough mixing of the dried manganese nitrate-ore material and the potassium carbonate solution. The resulting pasty mixture was allowed to dry at 220° F. for several hours. The resulting dried mixture was then fused in an electric arc furnace until the material became a molten mass. The fusion equipment comprised a water-cooled copper-mold fitted with a carbon electrode. The material was fused in an electric arc projected from the carbon electrode through the impregnated ore to the base iron plate on the copper mold. The fusion apparatus drew approximately 400 amperes while the voltage was maintained constant at 40 volts by the automatic regulation of the carbon electrode above the melt. The resulting liquid mass was cooled until it solidified. The solidified mass was broken into large chunks and crushed in a jaw crusher. The fragments were then charged to a reduction chamber and reduced by passing a stream of hydrogen upwardly through the reduction chamber in which the fragments formed a stationary bed. The fragments were reduced at a pressure of 250 p. s. i. and an average outlet rate of 1000 volumes of hydrogen at normal conditions (32° F. and 1 atmosphere) per hour per volume of catalyst, the temperature being maintained at about 700° F. for a period of 48 hours. At the end of the reduction or when the formation of water ceased, the temperature was lowered to 500° F. with hydrogen flowing.

The catalyst thus produced was designated as No. "C." This No. "C" contained by weight approximately 4.9 parts MnO, 0.53 part $K_2O$ and 100 parts metallic iron (not including silica, alumina and titania originally present in the Alan Wood ore).

The catalyst produced in the above manner was then tested for the hydrogenation of carbon monoxide to produce hydrocarbons having more than one carbon atom per molecule and oxygenated organic compounds by contacting the catalyst with a gaseous stream comprising hydrogen and carbon monoxide in a mole ratio averaging about 2.2:1. The carbon dioxide in this gaseous stream averaged about 0.8 volume percent, light hydrocarbons and nitrogen averaged about 0.5 volume percent. The reaction conditions and the results obtained from the hydrogenation of carbon monoxide with the fused iron catalyst are shown in Table I.

EXAMPLE II

Approximately 134 grams of manganese nitrate solution (Bakers CP about 80% $Mn(NO_3)_2.6H_2O$) was diluted with 200 cc. of water and heated to boiling. The hot manganese nitrate solution was mixed with about 3600 grams of hot powdered Alan Wood magnetite ore, the ore having been heated to a temperature of 240° F. The resulting paste was dried overnight at a temperature of about 240° F. The dried material was then thoroughly mixed with a warm solution of potassium carbonate which was prepared by dissolving 23.8 grams of potassium carbonate in 400 cc. of water and heating to boiling. The resulting pasty mixture was dried at 240° F. and ground for fusion. The dried material was then fused and reduced with hydrogen as described in Example I.

The catalyst thus produced was designated No. "B." This No. "B" contained by weight approximately 0.92 part MnO, 0.57 part $K_2O$ and 100 parts metallic iron (not including silica, alumina and titania originally present in the Alan Wood ore).

The catalyst produced in the above manner was then tested for the hydrogenation of carbon monoxide to produce hydrocarbons having more than one carbon atom per molecule and oxygenated organic compounds by contacting the catalyst with a gaseous stream comprising hydrogen and carbon monoxide in a mole ratio averaging 2.2:1. The carbon dioxide in this gaseous stream averaged about 0.8 volume percent and light hydrocarbons and nitrogen were less than 0.7 volume percent. The reaction conditions and the results obtained from the hydrogenation of carbon monoxide with the fused iron catalyst are shown in Table I.

EXAMPLE III

Approximately 24,000 grams of Alan Wood ore was well mixed with about 150 grams of technical grade potassium carbonate. The iron ore powder and carbonate were dry-mixed in a rotating ball mill. The mixed powders were charged continuously to the double arc fusion furnace for fusion. The melt was allowed to cool before being crushed in the jaw crusher to 12 to 20 mesh.

The catalyst thus produced was designated No. "A" and was used as a standard. This No. "A" contained by weight approximately 0.6 part $K_2O$ and 100 parts of metallic iron (not including silica, alumina and titania originally present in the Alan Wood ore).

The catalyst produced in the above manner was then tested for the hydrogenation of carbon monoxide to produce hydrocarbons having more than one carbon atom per molecule and oxygenated organic compounds by contacting the catalyst with a gaseous stream comprising hydrogen and carbon monoxide in a mole ratio of 2.2:1. The carbon dioxide in this gaseous stream averaged about 0.8 volume percent and light hydrocarbons and nitrogen averaged less than 0.7 volume percent. The reaction conditions and the results obtained from the hydrogenation of carbon monoxide with the fused iron catalyst are shown in Table I.

EXAMPLE IV

About 510 grams of thorium nitrate $Th(NO_3)_1.4H_2O$ was dissolved in 700 ccs. of distilled water and the solution was thoroughly mixed with 6,800 grams of powdered Alan Wood ore in a mechanical mixer to form a thick paste. The resulting paste was dried overnight at 250° F. The dried material was then crushed to a powder and was calcined at a temperature of about 1000° F. for about three hours in a muffle furnace. After calcination 7,024 grams of the material was mixed with 108 grams of $K_2CO_3$ and ball milled to produce a powder smaller than about 30 mesh. The resulting mixture was then fused in a similar manner to that in Example I. The molten mass was cooled to form a solid mass. The solidified material was crushed and ball milled to produce a powder of the desired size, between about 8 and 12 mesh. The fused material was charged to a hydrogen recirculating furnace for reduction with hydrogen. The reduction was carried out over a period of five hours. The average reduction temperature was about 1445° F. and the maximum temperature observed was 1475° F. The formation of water terminated about one hour before the end of the reduction period. This catalyst was designated No. 423-1 and had a composition by weight of 5 parts $ThO_2$, 1.5 parts $K_2O$, and about 100 parts iron. The catalyst was cooled in hydrogen and blanketed in carbon dioxide for transfer to the reaction chamber. The reaction chamber was brought to initial testing condition of 500° F. and 250 lbs. per square inch. The operation for the synthesis of organic compounds with hydrogen and carbon monoxide was carried out over a period of about 200 hours during which time the catalyst was tested at a temperature varying from 500° F. to 620° F. The composition of the synthesis feed gas used during operation was a mol ratio of about 1.4:1 of hydrogen to carbon monoxide. The carbon dioxide content of the feed gas varied from 1.6 to 2.9 volume percent while the volume of low-boiling hydrocarbons and nitrogen varied from 4.5 to 5.0 volume percent. Table IV below shows operating conditions and the results obtained with this catalyst. Table V shows the formation of carbon and wax on the used catalyst after about 200 hours use.

Table I

| Catalyst Number | A | | | B | | | C | | |
|---|---|---|---|---|---|---|---|---|---|
| Composition | Fe: 0.006 $K_2O$ | | | Fe: 0.0092 MnO : 0.0057 $K_2O$ | | | Fe: 0.049 MnO : 0.0053 $K_2O$ | | |
| Wt. of Catalyst Chge. (gms.) | 104.7 gms. (40 cc.) | | | 102.5 gms. (40 cc.) | | | 98.5 gms. (40 cc.) | | |
| Fragment Size | 12–20 mesh | | | 12–20 mesh | | | 12–20 mesh | | |
| Total Hours of Operation | 65 | 89 | 137 | 64 | 88 | 112 | 65 | 89 | 129 |
| Pressure, p. s. i. | 250 | 250 | 250 | 250 | 250 | 250 | 250 | 250 | 250 |
| Catalyst Temp., Degrees F | 540 | 580 | 620 | 540 | 580 | 620 | 540 | 580 | 620 |
| Space Velocity, V./Hr./V | 453 | 466 | 501 | 456 | 496 | 540 | 413 | 365 | 554 |
| Contraction, percent | 42 | 43 | 48 | 46 | 52 | 57 | 46 | 48 | 53 |
| Gas In, Cu. Ft., 32° F., 1 Atm | 15.34 | 15.80 | 17.00 | 15.45 | 16.81 | 18.32 | 13.98 | 12.35 | 12.53 |
| Gas Out, Cu. Ft., 32° F., 1 Atm | 8.87 | 9.08 | 8.88 | 8.42 | 8.04 | 7.87 | 7.50 | 6.37 | 5.94 |
| Obs. Oil, cc./m.³ | 78 | 80 | 62 | 66 | 67 | 73 | 56 | 66 | 45 |
| Obs. $H_2O$, cc./m.³ | 87 | 87 | 110 | 71 | 105 | 116 | 61 | 77 | 91 |
| Prim. Recovery Oil, cc./m.³ | 51 | 56 | 35 | 41 | 42 | 44 | 41 | 46 | 17 |
| Oil Collected, cc | 34 | 36 | 30 | 29 | 32 | 38 | 22 | 23 | 16 |
| Water Collected, cc | 38 | 39 | 53 | 31 | 50 | 60 | 24 | 27 | 32 |
| Percent CO converted (overall) | 97.9 | 97.2 | 97.0 | 96.1 | 97.8 | 97.6 | 95.5 | 96.5 | 96.6 |
| Percent CO→$CO_2$ | 29.1 | 32.9 | 29.2 | 29.6 | 23.8 | 20.3 | 28.5 | 27.7 | 27.3 |
| Feed Gas, Vol. percent: | | | | | | | | | |
| $CO_2$ | 0.8 | | | 0.8 | | | 0.8 | | |
| $H_2$ | 67.7 | | | 68.3 | | | 67.7 | | |
| CO | 30.8 | | | 30.8 | | | 30.8 | | |
| $CH_4$ | 0.1 | | | 0.1 | | | 0.1 | | |
| $N_2$ | 0.6 | | | | | | 0.6 | | |
| $H_2$/CO | 2.2 | | | 2.2 | | | 2.2 | | |
| Product Gas, Vol. percent: | | | | | | | | | |
| $CO_2$ | 16.9 | 19.0 | 18.4 | 18.2 | 17.0 | 16.4 | 18.0 | 18.2 | 19.0 |
| $H_2$ | 68.8 | 65.9 | 64.1 | 70.7 | 66.5 | 66.6 | 69.3 | 66.1 | 63.0 |
| CO | 1.1 | 1.5 | 1.8 | 2.2 | 1.4 | 1.7 | 2.6 | 2.1 | 2.3 |
| $CH_4$ | 5.4 | 5.4 | 8.3 | 3.4 | 5.4 | 6.7 | 4.1 | 5.6 | 9.2 |
| $C_2$'s | 2.0 | 2.0 | 2.4 | 1.6 | 2.2 | 2.4 | 1.5 | 2.0 | 2.3 |
| $C_3$+ | 3.2 | 2.7 | 2.9 | 2.0 | 3.0 | 3.0 | 2.5 | 2.9 | 2.5 |
| Unsat | 4.8 | 3.6 | 4.0 | 2.4 | 3.6 | 4.0 | 3.0 | 3.4 | 3.4 |
| $N_2$ | 2.6 | 3.5 | 2.1 | 1.9 | 4.5 | 3.2 | 2.0 | 3.1 | 1.7 |
| Oil Inspections, Wt. percent: | | | | | | | | | |
| Monoolefins (130 M. W.) | | 63 | | | 57 | | | 59 | |
| Acidity (120 M. W.) | | 2.9 | | | 2.8 | | | 1.8 | |
| $H_2O$ Inspections, Wt. percent: | | | | | | | | | |
| Chemicals | | 13.2 | | | 8.2 | | | 9.1 | |
| Acidity (60 M. W.) | | 1.7 | | | 0.6 | | | 1.5 | |

Table II

| Catalyst No | A | | | B | | | C | | |
|---|---|---|---|---|---|---|---|---|---|
| Pressure, p. s. i. | 250 | 250 | 250 | 250 | 250 | 250 | 250 | 250 | 250 |
| Temp., °F | 540 | 580 | 620 | 540 | 580 | 620 | 540 | 580 | 620 |
| Percent CO converted | 98 | 98 | 97 | 96 | 98 | 98 | 95 | 96 | 97 |
| Percent CO→$CO_2$ | 29.1 | 32 | 29 | 30 | 24 | 20 | 28 | 28 | 27 |
| Percent CO→HC's & Chem | 69 | 66 | 68 | 67 | 74 | 77 | 67 | 68 | 70 |
| $CH_4$, Number [1] | 14 | 16 | 20 | 9 | 11 | 12 | 10 | 13 | 20 |
| $C_2$, Number [1] | 11 | 11 | 12 | 8.5 | 9 | 9 | 8 | 9 | 10 |
| $C_3$+Chem., Number [1] | 75 | 73 | 68 | 82.5 | 80 | 79 | 82 | 78 | 70 |

[1] Percent CO to $CH_4$ or $C_2$, or $C_3$+, divided by percent CO to H. C.'s and chemicals × 100.

Table II above shows the selectivity of the various manganese oxide-low alkali iron catalysts of this invention as compared with the standard low alkali iron catalyst.

Table III

| | Hrs. of Operation | Temp., Deg. F. | Pressure, p. s. i. | Wt. Percent Wax | Wt. Percent C |
|---|---|---|---|---|---|
| Catalyst No.: | | | | | |
| A | 137 | 620 | 250 | 1.16 | 2.5 |
| B | 124 | 660 | 250 | 0.90 | 1.98 |
| C | 129 | 620 | 250 | 1.5 | 2.5 |

Table III above shows the composition of the various manganese oxide-containing low alkali iron catalysts with respect to wax and carbon, and the composition of the standard low alkali iron catalyst with respect to wax and carbon.

A catalyst prepared in a similar manner to the catalyst No. 423–1 but using manganese nitrate instead of thorium nitrate had a composition of about 5 parts by weight MnO, about 1.5 parts $K_2O$, and 100 parts metallic iron (small proportion of silica, alumina, and titania also present from original ore). This catalyst under similar operating conditions as the previous catalyst produced 119 cc./m.³ of oil and about 75 cc./m.³ of water.

In all catalyst compositions reported herein, the iron after reduction was reported as Fe. The reduction process may not completely reduce the iron oxides to Fe and, consequently, small proportions of the iron may be present in other forms. The catalyst compositions also reported only the added ingredients in preparing the catalyst. Thus, such materials as silica, alumina, and titania will be present to some extent in the catalyst in all cases where Alan Wood ore was the source of the iron compound raw material whether or not actually reported.

Table IV

| | | | | | | | |
|---|---|---|---|---|---|---|---|
| Total Hours Of Operation | 42 | 54 | 90 | 114 | 138 | 162 | 186 |
| Pressure, p. s. i. | 250 | 250 | 250 | 250 | 250 | 250 | 250 |
| Catalyst Temp., °F | 500 | 520 | 540 | 560 | 580 | 600 | 620 |
| Gas Rate, V./Hr./V | 165 | 197 | 199 | 195 | 231 | 234 | 242 |
| Contraction, percent | 48 | 47 | 46 | 56 | 58 | 60 | 60 |
| Obs. Oil, cc./m.³ (Tot. Gas at 32° F.) | 52 | 80 | 50 | 87 | 98 | 94 | 91 |
| Obs. H₂O, cc./m.³ (Tot. Gas at 32° F.) | 29 | 51 | 42 | 63 | 75 | 77 | 80 |
| Prim. Oil, cc./m.³ | 44 | 61 | 35 | 71 | 77 | 77 | 70 |
| Percent CO converted | | | | | 97 | | |
| Percent CO→CO₂ | | | | | 27 | | |

| Feed Gas, Vol. Percent: | | | | | | | |
|---|---|---|---|---|---|---|---|
| CO₂ | | | 2.9 | | | 1.6 | |
| H₂ | | | 53.2 | | | 53.9 | |
| CO | | | 39.5 | | | 39.5 | |
| Residual | | | 4.4 | | | 5.0 | |
| H₂/CO | | | 1.4:1.0 | | | 1.4:1.0 | |
| Mol. Wt. | | | 14 | | | 14 | |

| Product Gas, Vol. Percent: | | | | | | | |
|---|---|---|---|---|---|---|---|
| CO₂ | | | | | 32.5 | | |
| H₂ | | | | | 45.2 | | |
| CO | | | | | 3.1 | | |
| CH₄ | | | | | 16.0 | | |
| C₂+ | | | | | 3.2 | | |
| Mol. Wt. | | | | | 21 | | |
| Oil Inspections: | | | | | | | |
| Distillation, °F.— | | | | | | | |
| I. B. P. | | | | | 172 | | |
| 5% | | | | | 206 | | |
| 10% | | | | | 385 | | |
| 50% | | | | | 676 | | |
| 90% | | | | | | | |
| E P | | | | | 170 | | |
| Mol. Wt. | | | | | 63 | | |
| Monoolefins, Mol. percent | | | | | 8 | | |
| Wax, Wt. percent | | | | | | | |
| Wax, M. P. °F | | | | | 197 | | |
| H₂O Inspections: | | | | | | | |
| H₂O, K. F. R., Wt. percent | | | | | 89 | | |
| Acid (Wt. percent CH₃COOH) | | | | | 2.4 | | |

Table V

| Catalyst No. | Oil and Wax, Wt. Percent | Wax, M. P., °F. | Carbon, Wt. Percent |
|---|---|---|---|
| 423-1 | 4.8 | 245 | 4.5 |

We claim:

1. A process for hydrogenating carbon monoxide which comprises flowing a gaseous mixture comprising hydrogen and a carbon monoxide through a reaction zone in the presence of a catalyst comprising elementary iron obtained by the reduction of naturally occurring magnetite as the major component and between about 0.8 and about 1.5 weight percent of manganese oxide and between about 0.2 and about 2.5 weight percent of an alkali compound as promoters based on ultimate catalyst at a temperature between about 550° F. and about 650° F. and a pressure between about 80 and about 600 pounds per square inch gage such that hydrogen and carbon monoxide are converted to organic compounds including hydrocarbons and recovering organic compounds thus produced as products of the process.

2. The process of claim 1 in which said alkali compound is an alkali metal oxide.

3. The process of claim 1 in which said alkali compound is potassium oxide.

4. A catalyst which comprises elementary iron obtained by reducing naturally occurring magnetite as the major component and between about 0.8 and about 1.5 weight percent of manganese oxide and between about 0.2 and about 2.5 weight percent of an alkali metal oxide.

References Cited in the file of this patent

UNITED STATES PATENTS

| | | |
|---|---|---|
| 2,159,077 | Duftschmid et al. | May 23, 1939 |
| 2,287,891 | Linckh | June 30, 1942 |
| 2,292,570 | Klemm et al. | Aug. 11, 1942 |
| 2,418,888 | Kearby | Apr. 15, 1947 |
| 2,418,889 | Kearby | Apr. 15, 1947 |
| 2,488,150 | Walden et al. | Nov. 15, 1949 |
| 2,686,196 | Kirshenbaum et al. | Aug. 10, 1954 |

FOREIGN PATENTS

| | | |
|---|---|---|
| 708,512 | Germany | June 12, 1941 |